(12) United States Patent
Chang et al.

(10) Patent No.: US 11,307,982 B2
(45) Date of Patent: Apr. 19, 2022

(54) MEMORY MANAGEMENT METHOD WITH A DATA MERGING PROCESS BASED ON RISK PHYSICAL UNITS AND DISTRIBUTION COUNTS, MEMORY STORAGE DEVICE AND MEMORY CONTROL CIRCUIT UNIT

(71) Applicant: PHISON ELECTRONICS CORP., Miaoli (TW)

(72) Inventors: Kuang-Yao Chang, Taipei (TW); Shin-Wei Gau, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/035,604

(22) Filed: Sep. 28, 2020

(65) Prior Publication Data

US 2022/0075715 A1 Mar. 10, 2022

(30) Foreign Application Priority Data

Sep. 9, 2020 (TW) ................................ 109130892

(51) Int. Cl.
*G06F 12/02* (2006.01)
*G06F 12/0891* (2016.01)
*G06F 13/16* (2006.01)
*G06F 11/30* (2006.01)

(52) U.S. Cl.
CPC ...... *G06F 12/0246* (2013.01); *G06F 11/3037* (2013.01); *G06F 12/0891* (2013.01); *G06F 13/1668* (2013.01); *G06F 2212/7201* (2013.01)

(58) Field of Classification Search
CPC ............. G06F 12/0246; G06F 12/0891; G06F 11/3037; G06F 13/1668; G06F 2212/7201
See application file for complete search history.

(56) References Cited

U.S. PATENT DOCUMENTS

2006/0126211 A1\* 6/2006 Sasaki .................... G11B 15/07
360/74.4
2010/0088482 A1\* 4/2010 Hinz .................... G06F 12/0246
711/166

(Continued)

FOREIGN PATENT DOCUMENTS

TW 200903500 1/2009
TW 201324145 6/2013

(Continued)

OTHER PUBLICATIONS

"Office Action of Taiwan Counterpart Application", dated Oct. 6, 2021, p. 1-p. 9.

(Continued)

*Primary Examiner* — Tasnima Matin
(74) *Attorney, Agent, or Firm* — JCIPRNET (57) ABSTRACT

A data management method, a memory storage device and a memory control circuit unit. The method includes: executing one or more read commands, and recording a physical unit having a first variation of a read count greater than a read disturb threshold as a risk physical unit; and when a data merging process is performed, dividing valid data stored in the risk physical unit into a plurality of copies and copying the copies into a plurality of recycling units.

21 Claims, 7 Drawing Sheets

(56) References Cited

U.S. PATENT DOCUMENTS

2014/0281143 A1* 9/2014 Shivashankaraiah ........................ G06F 12/0246
711/103
2017/0132125 A1* 5/2017 Cai .......................... G06F 11/10
2019/0361806 A1* 11/2019 Hwang .............. G11C 16/3422

FOREIGN PATENT DOCUMENTS

| TW | 201732822 | 9/2017 |
| TW | 201928678 | 7/2019 |
| TW | 202011199 | 3/2020 |
| TW | 202024919 | 7/2020 |

OTHER PUBLICATIONS

"Office Action of Taiwan Counterpart Application", dated Jan. 26, 2022, p. 1-p. 11.

* cited by examiner

FIG. 11

MEMORY MANAGEMENT METHOD WITH A DATA MERGING PROCESS BASED ON RISK PHYSICAL UNITS AND DISTRIBUTION COUNTS, MEMORY STORAGE DEVICE AND MEMORY CONTROL CIRCUIT UNIT

CROSS-REFERENCE TO RELATED APPLICATION

This application claims the priority benefit of Taiwan application serial no. 109130892, filed on Sep. 9, 2020. The entirety of the above-mentioned patent application is hereby incorporated by reference herein and made a part of this specification.

BACKGROUND

1. Technology Field

The invention relates to a memory management technique, and more particularly, to a memory management method, a memory storage device and a memory control circuit unit.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

A memory storage device can select one physical block (a.k.a. an active physical block) from a spare area to store data from a host system. For example, after the active physical block is selected and before the active physical block is fully written, the data from the host system will be received and stored in this active physical block. After the current active physical block is fully written, another physical block will be selected from the spare area as a new active physical block to continually store the data from the host system. When the host system intends to read the stored data, the memory storage device will read the data from the physical block according to a read command. In general, as a read count of the physical block increases, it will lead to hardware loss and the possibility of read disturb. The so-called read disturb refers to the fact that when the data stored in the same physical block is read multiple times, it is likely that the read data may include errors, or worst yet, the data stored in the physical erasing unit read multiple times may be abnormal or lost. Therefore, when the read count of the physical block is too high, valid data stored in the physical block in a storage area can be moved by a garbage collection process so that a new idle physical block can be released.

However, when the same data is frequently read, even if the data is moved to a new physical block, the read count of the new physical block will still accumulate quickly. When the read count is too high again due to accumulation, the data will be moved again. As a result, the overall efficiency of the memory storage device will decrease due to frequent data movement to the new physical block.

SUMMARY

The invention provides a memory management method, a memory storage device and a memory control circuit unit, which can reduce the number of data transfers caused by the read count of the physical unit accumulated excessively fast.

An exemplary embodiment of the invention provides a memory management method for a rewritable non-volatile memory module. The rewritable non-volatile memory module includes a plurality of physical units. The memory management method includes: executing one or more read commands, and recording a physical unit having a first variation of a read count greater than a read disturb threshold as a risk physical unit; and when a data merging process is performed, dividing valid data stored in the risk physical unit into a plurality of copies and copying the copies into a plurality of recycling units.

An exemplary embodiment of the invention provides a memory storage device, which includes a connection interface unit, a rewritable non-volatile memory module and a memory control circuit unit. The connection interface unit is configured to couple to a host system. The rewritable non-volatile memory module includes a plurality of physical units. The memory controlling circuit unit is coupled to the connection interface unit and the rewritable non-volatile memory module. The memory control circuit unit is configured to execute one or more read commands, and record the physical unit having a first variation of a read count greater than a read disturb threshold as a risk physical unit. Further, when a data merging process is performed, the memory control circuit unit is further configured to divide valid data stored in the risk physical unit into a plurality of copies and copy the copies into a plurality of recycling units.

An exemplary embodiment of the invention provides a memory control circuit unit for controlling a rewritable non-volatile memory module. The rewritable non-volatile memory module includes a plurality of physical units. The memory control circuit unit includes a host interface, a memory interface and a memory management circuit. The host interface is configured to couple to a host system. The memory interface is configured to couple to a rewritable non-volatile memory module. The memory management circuit is coupled to the host interface and the memory interface. The memory management circuit is configured to execute one or more read commands, and record the physical unit having a first variation of a read count greater than a read disturb threshold as a risk physical unit. Further, when a data merging process is performed, the memory management circuit is further configured to divide valid data stored in the risk physical unit into a plurality of copies and copy the copies into a plurality of recycling units.

Based on the above, the memory management method, the memory storage device, and the memory control circuit unit provided by the embodiments of the invention can pre-monitor the physical unit having a read disturb risk and divide the valid data stored in the physical unit having the read disturb risk into multiple copies for distribution. In this way, the number of data transfers caused by the read count of the physical unit accumulated excessively fast can be reduced, thereby improving the system performance of the memory storage device.

To make the aforementioned more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the disclosure may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit unit). The memory storage device usually operates together with a host system so the host system can write data into the memory storage device or read data from the memory storage device.

Figure 1:
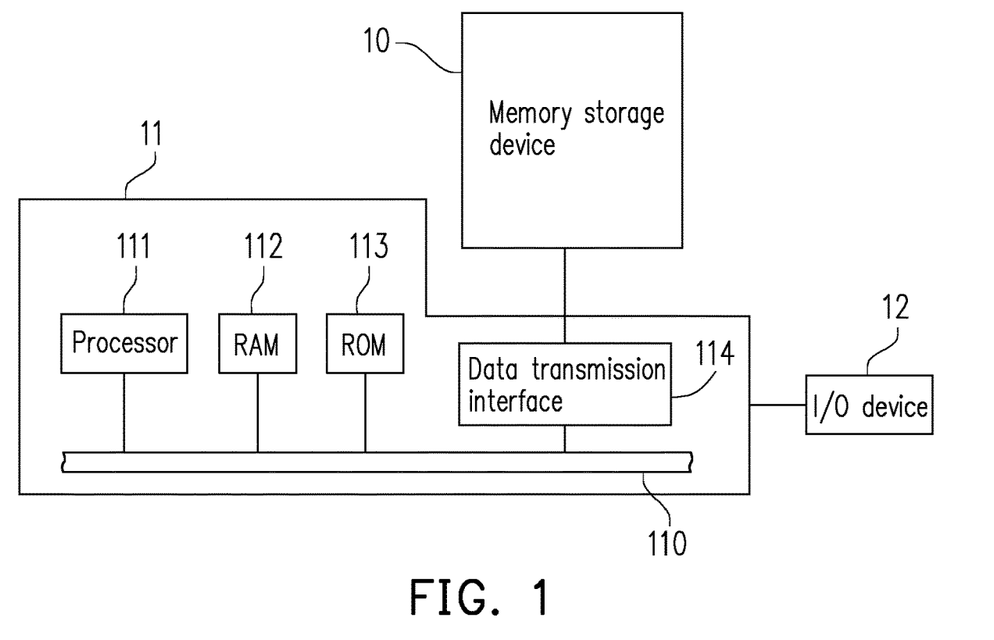
FIG. 1 is a schematic diagram illustrating a host system, a memory storage device and an I/O (input/output) device according to an exemplary embodiment of the disclosure.
Figure 2:
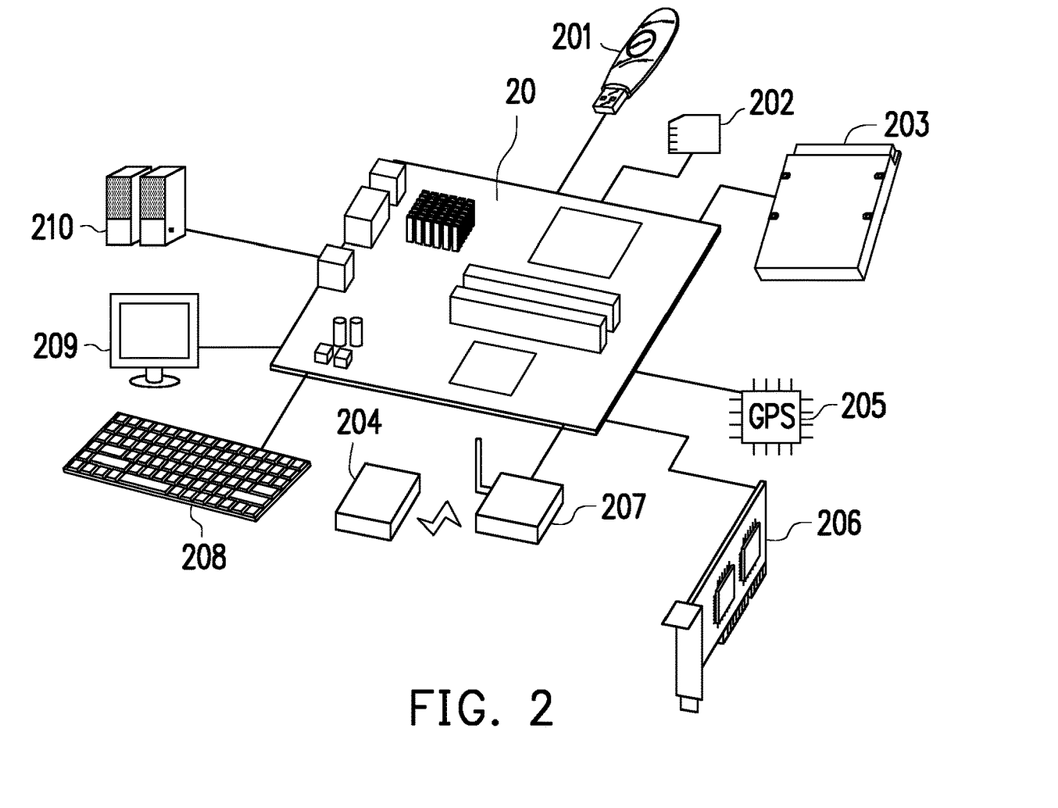
FIG. 2 is a schematic diagram illustrating a host system, a memory storage device and an I/O (input/output) device according to an exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O (input/output) device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can write data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
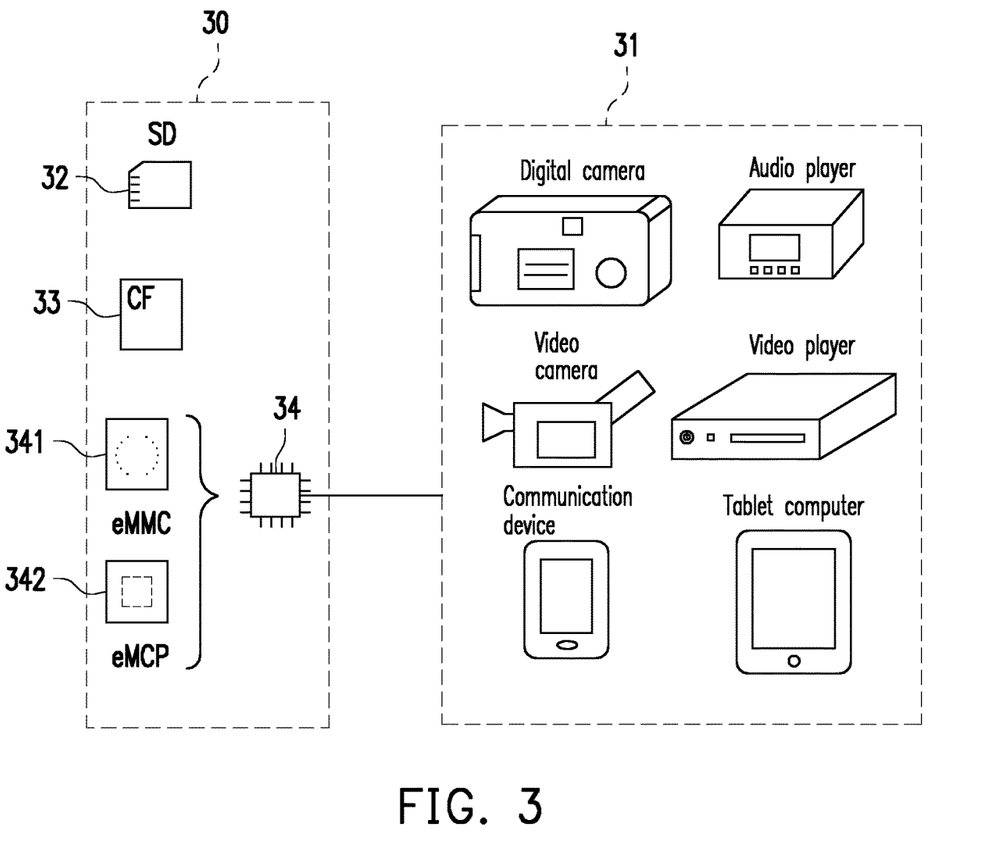
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
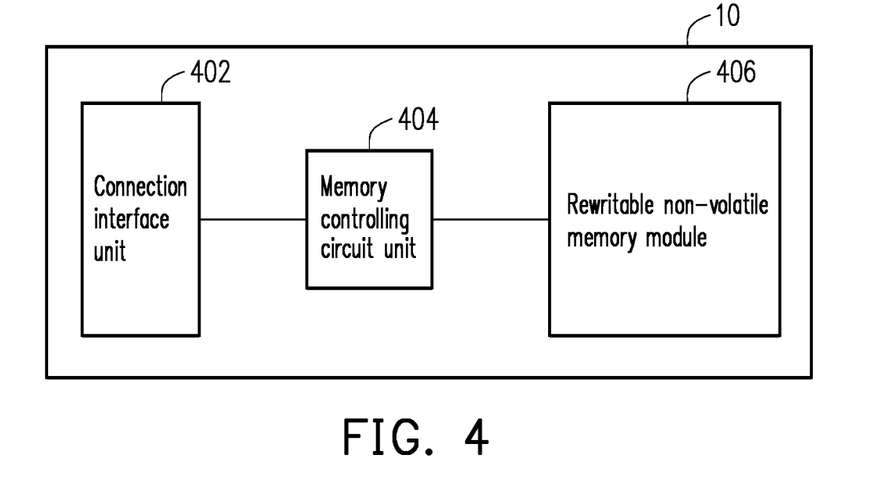
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a SATA (Serial Advanced Technology Attachment) standard. Nevertheless, it should be understood that the invention is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For example, a LSB (Least Significant Bit) of one memory cell belongs to the lower physical programming unit, and a MSB (most significant bit) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundancy bit area is configured to store system data (e.g., management data such as the error correcting code). In the present exemplary embodiment, the data bit area includes 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

In an exemplary embodiment, the physical programming unit and the physical erasing unit may be composed of a plurality of continuous physical nodes in a plane (a.k.a. a memory plane). Alternatively, in an exemplary embodiment, the physical programming unit and the physical erasing unit may be composed of a plurality of continuous physical nodes in a chip enable (CE). Alternatively, in an exemplary embodiment, the physical programming unit and the physical erasing unit may be composed of a plurality of continuous physical nodes in a plurality of planes.

Figure 5:
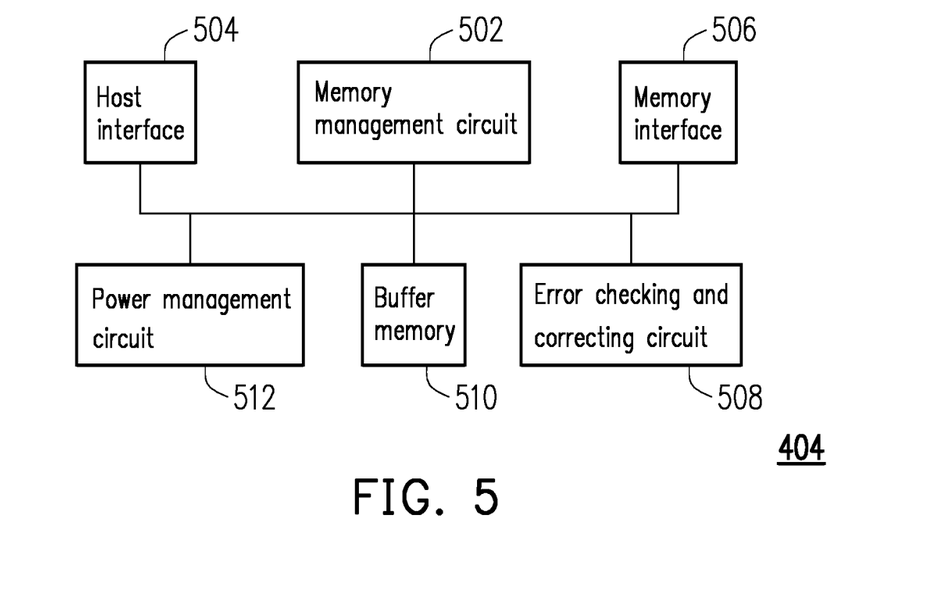
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. When the memory storage device 10 operates, the control commands are executed by the microprocessor to execute operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the SATA standard. Nevertheless, it should be understood that the invention is not limited in this regard. The host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory processes (e.g., changing read voltage levels or performing a garbage collection process). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data and the ECC and/or the EDC corresponding to the write command into the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
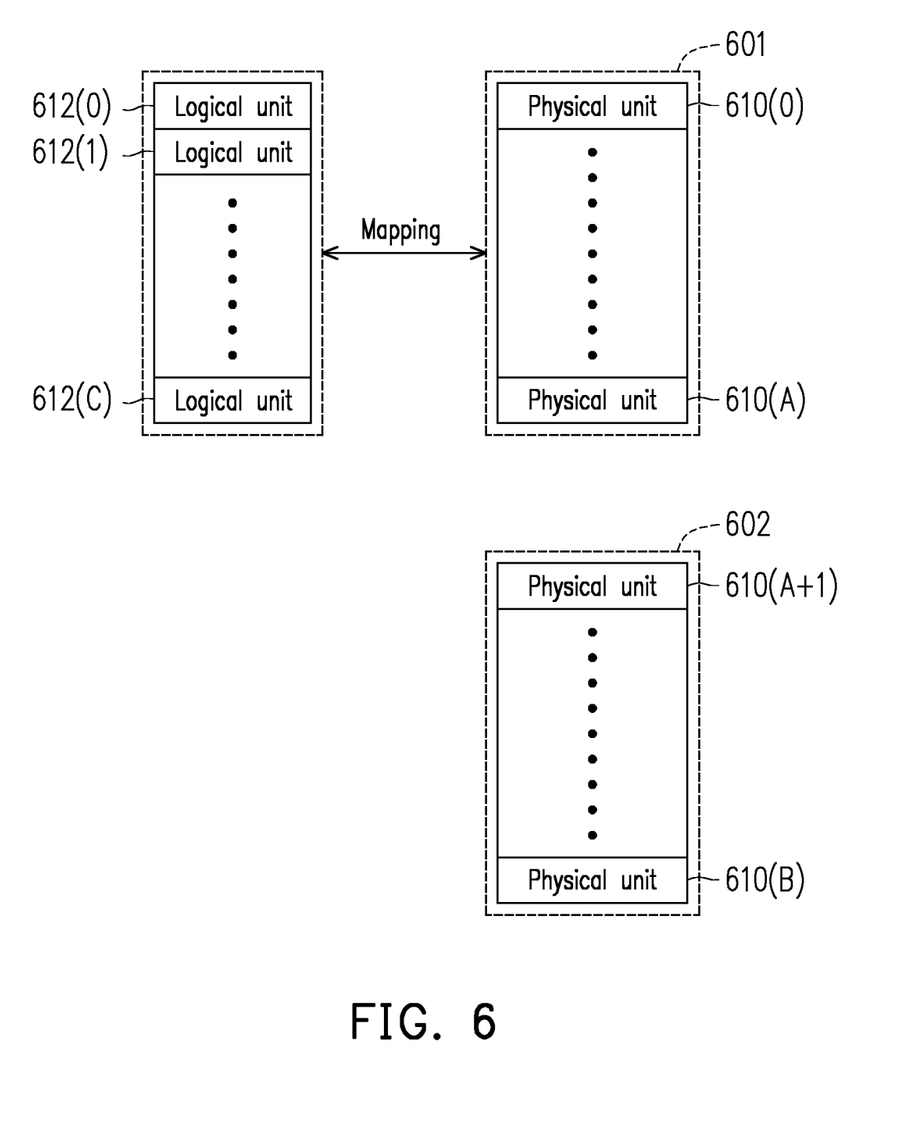
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the invention.

Referring to FIG. 6, the memory management circuit 502 logically groups the memory cells of the rewritable non-volatile memory module 406 into physical units 610(0) to 610(B). In the present exemplary embodiment, each of the physical units 610(0) to 610(B) refers to one physical erasing unit. However, in another exemplary embodiment, each of the physical units 610(0) to 610(B) may also contain a plurality of physical erasing units.

In the present exemplary embodiment, the memory management circuit 502 logically groups the physical units 610(0) to 610(B) into a storage area 601 and a spare area 602. The physical units 610(0) to 610(A) in the storage area 601 are stored with data, and the physical units 610(A+1) to 610(B) in the spare area 602 are not yet used for storing data. For example, each physical unit belonging to the storage area 601 may be stored with valid data and/or invalid data, and one physical unit belonging to the storage area 601 being erased is associated to the spare area 602. After one physical unit belonging to the storage area 601 is fully written, one specific physical unit is then selected from the spare area 602 and associated to the storage area 601 for storing other data.

In an exemplary embodiment, each physical unit belonging to the spare area 602 is also known as a spare physical unit, and each physical unit belonging to the storage area 601 is also known as a non-spare physical unit. In an exemplary embodiment, the spare physical unit is also known as a first-type physical unit, and the non-spare physical unit is also known as a second-type physical unit.

In the present exemplary embodiment, the memory management circuit 502 configures logical units 612(0) to 612(C) for mapping to at least one part of the physical units 610(0) to 610(A) in the storage area 601. In the present exemplary embodiment, the host system 11 accesses the data stored in the storage area 601 through a logical address (LA). Therefore, each of the logical units 612(0) to 612(C) refers to one logical address. However, in another exemplary embodiment, each of the logical units 612(0) to 612(C) may also be composed of a plurality of consecutive (consecutively numbered) logical addresses.

In the present exemplary embodiment, the memory management circuit 502 records a mapping relation (a.k.a. a logical-physical mapping relation) between the logical units and the physical units into at least one logical-to-physical mapping table. When the host system 11 intends to read the data from the memory storage device 10 or write the data into the memory storage device 10, the memory management circuit 502 may access the data in the memory storage device 10 according to the logical-to-physical mapping table. In an exemplary embodiment, the logical-to-physical mapping table and specific management data (e.g., a management table recorded with management information of the memory storage device 10) are stored in other physical units not belonging to the storage area 601 and the spare area 602 to avoid being modified by the user.

In the present exemplary embodiment, the valid data is current data (or latest data) belonging to one specific logical unit, and the invalid data is the current data not belonging to any logical unit. For example, if the host system 11 stores new data into one logical unit to overwrite old data originally stored in that logical unit (i.e., update data belonging to that logical unit), the new data in the storage area 601 is the current data belonging to that specific logical unit and marked as valid, whereas the old data being overwritten may still be stored in the storage area 601 but marked as invalid.

In the present exemplary embodiment, if data belonging to one specific logical unit is updated, a mapping relation between that specific logical unit and the physical unit stored with the old data belonging to that specific logical unit is removed, and a mapping relation between that specific logical unit and the physical unit stored with the current data (or the latest data) belonging to that specific logical unit is established. However, in another exemplary embodiment, if data belonging to one logical unit is updated, a mapping relation between that logical unit and the physical unit stored with the old data belonging to that logical unit may still be maintained.

When the memory storage device 10 leaves the factory, a total number of the physical units belonging to the spare area 602 (i.e., the first-type physical unit) is a preset number (e.g., 30). With the memory storage device 10 being used overtime, more physical units are selected from the spare area 602 and associated to the storage area 601 for storing data (e.g., the user data from the host system 11). Accordingly, the total number of the physical units belonging to the spare area 602 (e.g., the first-type physical unit) gradually decreases as the memory storage device 10 being used overtime.

During operation of the memory storage device 10, the memory management circuit 502 continuously updates the total number of the physical units belonging to the spare area 602 (i.e., the first-type physical unit). The memory management circuit 502 determines whether the total number of the first-type physical unit is less than or equal to one threshold. The threshold may be, for example, 2 or a greater value (e.g., 10), which is not particularly limited by the invention. If the total number of the first-type physical unit is less than or equal to the threshold, the memory management circuit 502 performs one data merging process. In an exemplary embodiment, the data merging process is also known as the garbage collection process.

In the data merging process, the memory management circuit 502 selects at least one physical unit from the storage area 601 and attempts to collectively copy (or move) the valid data from the selected physical unit into another physical unit. The physical unit for storing the copied (or moved) valid data is selected from the spare area 602 and associated to the storage area 601. If the valid data stored by one specific physical unit is completely copied (or moved), that specific physical unit is then erased and associated to the spare area 602.

In an exemplary embodiment, an operation of re-associating one physical unit from the storage area 601 back to the spare area 602 is also known as releasing one spare physical unit. More spare physical units are released as an execution time of the data merging process increases. Accordingly, after the data merging process is started, the total number of the physical units belonging to the spare area 602 (i.e., the first-type physical unit) is gradually increased (e.g., changed from a first number to a second number). Herein, the second number is greater than the first number.

In an exemplary embodiment, the memory management circuit 502 determines whether a read count of the physical unit is greater than one pre-monitoring threshold (a.k.a. a first threshold). If the read count of any physical unit is greater than the first threshold, the memory management circuit 502 enters a monitoring mode. In addition, the memory management circuit 502 determines whether to perform the data merging process according to a threshold value (a.k.a. a second threshold). The first threshold is different from the second threshold. In an exemplary embodiment, the memory management circuit 502 continuously determines whether the read count of the physical unit is greater than one monitoring threshold (a.k.a. the second threshold). If the read count of any physical unit is greater than the second threshold, the memory management circuit 502 performs the data merging process.

Figure 7:
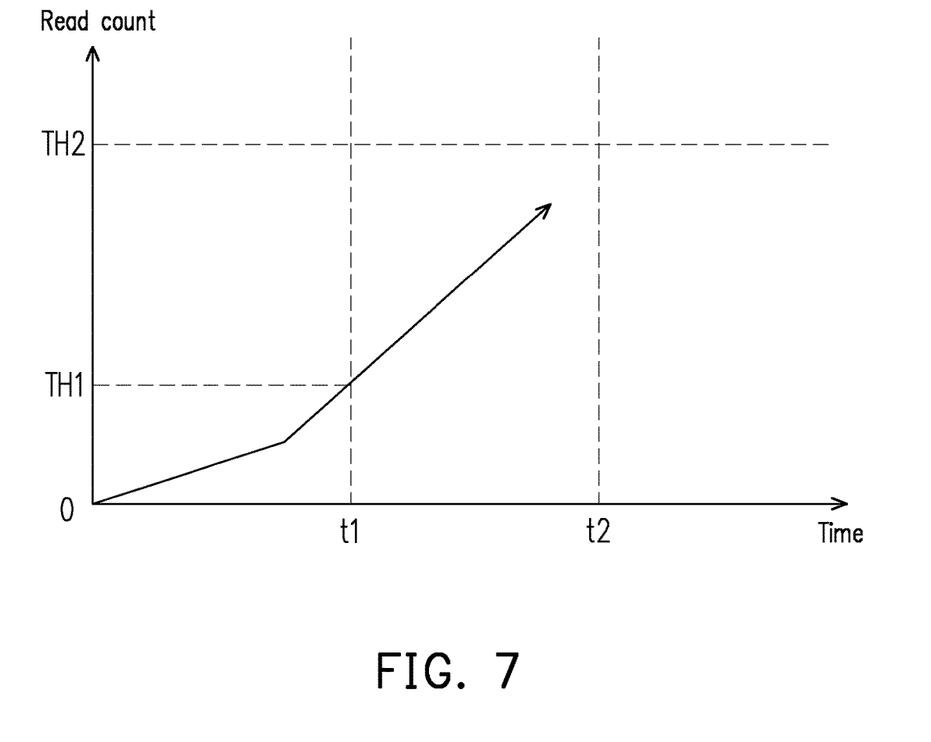
FIG. 7 is a schematic diagram of read count versus time according to an exemplary embodiment of the invention.

FIG. 7 is a schematic diagram of read count versus time according to an exemplary embodiment of the invention. Referring to a broken line graph in FIG. 7, the monitoring threshold is greater than the pre-monitoring threshold. However, the invention does not limit values of the pre-monitoring threshold and the monitoring threshold. In this exemplary embodiment, the read count of one specific physical unit is greater than a pre-monitoring threshold TH1 at a time t1. Accordingly, the memory management circuit 502 enters the monitoring mode at the time t1. Then, the read count of that specific physical unit is greater than a monitoring threshold TH2 at a time t2. Accordingly, the memory management circuit 502 performs the data merging process at the time t2.

In another exemplary embodiment, the memory management circuit 502 may also use the total number of the first-type physical units and the threshold value (a.k.a. the second threshold value) to determine whether to perform the data merging process as described above. The invention does not limit the conditions for performing data merging process.

After entering the monitoring mode, the memory management circuit 502 continues to receive and execute a read command, and records the physical unit having a variation per unit count (a.k.a. a first variation) of the read count greater than a read disturb threshold as a risk physical unit. The invention does not limit a value of the read disturb threshold. Then, when performing the data merging process, the memory management circuit 502 divides the valid data stored in the physical unit recorded as the risk physical unit into a plurality of copies and copies the copies into a recycling unit (a.k.a. a target physical unit).

In an exemplary embodiment, the memory management circuit 502 obtains the first variation by dividing a variation of the read count of the physical unit by the read count. This first variation is a risk index of each physical unit. The meaning of the first variation is to determine a reading density of each physical unit in a unit read count. The first variation being higher indicates that the risk index of the corresponding physical unit is higher. Therefore, the memory management circuit 502 records the physical unit having the first variation greater than the read disturb threshold as the risk physical unit.

In the monitoring mode, in addition to recording the risk physical unit, the memory management circuit 502 further creates read disturb management information (a.k.a. first management information). The first management information is used to select to-be-distributed valid data in the risk physical unit when the data merging process is determined to be performed. In detail, the first management information is used to record a risk value of the logical-to-physical mapping table corresponding to the read command after the monitoring mode is entered. When executing each read command, if the read physical programming unit is included in the physical unit recorded as the risk physical unit, the memory management circuit 502 will record the risk value of the logical-to-physical mapping table (Page Table Entry; PTE) corresponding to the read physical programming unit.

Figure 8:
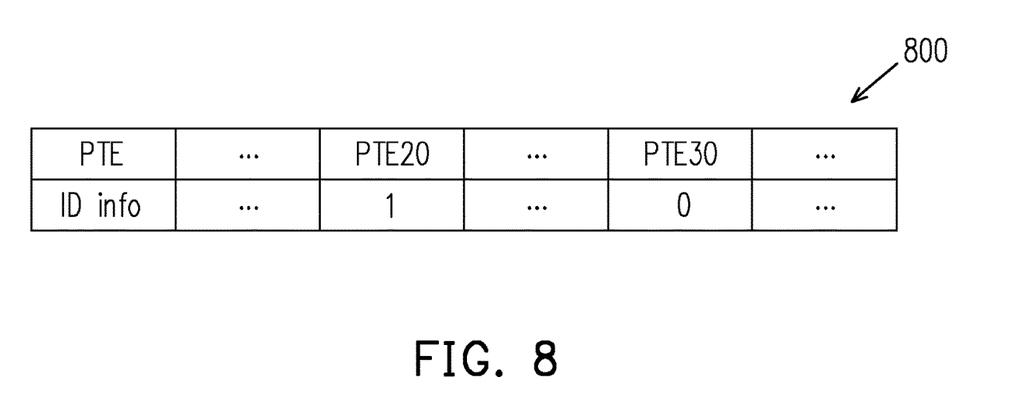
FIG. 8 is a schematic diagram illustrating first management information according to an exemplary embodiment of the disclosure.

FIG. 8 is a schematic diagram illustrating first management information according to an exemplary embodiment of the disclosure. In this exemplary embodiment, it is assumed that the physical unit 610(0) is recorded as the risk physical unit, and the first management information records table information 800 of the logic-to-physical mapping table corresponding to the risk physical unit 610(0). The table information 800 is used to record the risk value of the logical-to-physical mapping table corresponding to the physical unit 610(0). In this exemplary embodiment, when the memory management circuit 502 executes the read command, the read physical programming unit is included in the physical unit 610(0) recorded as the risk physical unit. In this case, the memory management circuit 502 records the risk value of a logic-to-physical mapping table PTE20 corresponding to the read physical programming unit in the table information 800. The risk value is recorded in identification information (ID info) in FIG. 8, for example. That is to say, the ID info of the logical-to-physical mapping table PTE20 in the table information 800 is recorded as a bit "1", which indicates that after the physical unit 610(0) is recorded as the risk physical unit, the logical-to-physical mapping table PTE20 mapping and corresponding to the physical programming unit of the physical unit 610(0) will be read when the read command is executed. The ID info of a logic-to-physical mapping table PTE30 is a bit "0", which indicates that the physical programming unit of the logic-to-physical mapping table PTE30 is not frequently read.

The memory management circuit 502 can select one of the risk physical units as a risk source unit (a.k.a. a risk source physical unit) when performing the data merging process. In an exemplary embodiment, the memory management circuit 502 can select the risk physical unit as the risk source unit according to the first management information. In detail, the memory management circuit 502 can select the risk physical unit corresponding to the logical-to-physical mapping table with the ID info being the bit "1" as the risk source unit. This means that the risk physical unit has been read recently. In another exemplary embodiment, the memory management circuit 502 can analyze a data volume of the valid data stored in the risk physical unit, and select the risk physical unit with a smallest data volume of the valid data as the risk source unit.

It should be noted that the memory management circuit 502 provided by the invention may also select the risk source unit used by utilizing other parameters and methods of the risk physical unit, which are not particularly limited in the invention.

In an exemplary embodiment, when performing the data merging process, the memory management circuit 502 divides the valid data stored in the physical unit recorded as the risk physical unit into multiple copies and copies the copies to the recycling unit. For example, the memory management circuit 502 can select one of the risk physical units as the risk source unit, and divide the valid data stored in the risk source unit into multiple copies and copies the copies to the recycling unit. In an exemplary embodiment, the recorded first management information described above may be used to determine the to-be-distributed valid data in the data merging process. That is, the memory management circuit 502 will preferentially select the most recently read valid data from the risk physical unit according to the first management information. For example, the memory management circuit 502 selects the valid data stored in the physical programming unit mapped by the logical-to-physical mapping table with the ID info being the bit "1" in the first management information as the valid data to be preferentially distributed (e.g., the valid data stored in the physical programming unit mapped by the logical-to-physical mapping table PTE20 in the table information 800).

In an exemplary embodiment, when determining that the data merging process needs to be performed, the memory management circuit 502 analyzes the data volume of the valid data stored in the selected risk physical unit, and calculates a to-be-distributed data volume of the valid data stored in the risk physical unit according to a distribution count. Then, the memory management circuit 502 copies the valid data stored in the risk physical unit and the valid data of other source units (a.k.a. source physical units) into the recycling unit according to the to-be-distributed data volume.

Specifically, the memory management circuit 502 calculates the data volume of the risk physical unit that needs to be distributed during this data merging process. First, the memory management circuit 502 analyzes the data volume of the valid data stored in the selected risk physical unit, and divides the data volume of the valid data by the distribution count to generate the to-be-distributed data volume. Here, the distribution count indicates how many times the data merging process needs to be used to distribute the data stored by the risk physical unit. The distribution count can be determined in advance by professional researchers through a series of experiments, and the invention does not limit a value of the distribution count. For instance, the distribution count may be calculated using an equation (1) below.

$$\alpha = (\text{valid count})/n \quad (1)$$

In the equation (1), $\alpha$ represents the to-be-distributed data volume; valid count represents the data volume of the valid data stored by the risk physical unit; n represents the distribution count.

After calculating the to-be-distributed data volume, the memory management circuit 502 selects the other source units to determine the source units in which the data is to be copied into the recycling units together with the partial valid data stored in the risk physical unit. In an exemplary embodiment, the memory management circuit 502 selects the physical units that are less frequently read as the source units. For example, the memory management circuit 502 can select one or more of the physical units as the source units according to a data read ratio and a valid data ratio corresponding to the physical units. In particular, the memory management circuit 502 selects the physical units with the lower data read ratio and/or the lower valid data ratio as the source units. For example, the memory management circuit 502 can rank the physical units according to a calculation result of an equation (2) below to determine the source units.

$$\delta = \text{read count ratio} \times A + \text{valid count ratio} \times B \quad (2)$$

In the equation (2), $\delta$ represents a determination parameter. Here, when a value of the determination parameter corresponding to the physical unit is lower, a ranking order of that physical unit selected as the source unit is higher. A and B represent weights, which can be determined in advance by professional researchers through a series of experiments. read count ratio represents the data read ratio. A low data read ratio means that the physical unit is less read, and the read count of a new physical unit to which the data is copied can increase slowly. In an exemplary embodiment, the data read ratio may be calculated using an equation (3) below.

$$\text{read count ratio} = \text{read count}_{block}/\text{threshold}_{read\ count} \quad (3)$$

In the equation (3), read count$_{block}$ represents the read counts of the physical units. threshold$_{read\ count}$ represents a read count threshold of the physical units.

valid count ratio represents the valid data ratio. A low valid data ratio can increase the efficiency of performing the data merging process. In an exemplary embodiment, the valid data ratio may be calculated using an equation (4) below.

$$\text{alid count ratio} = \text{valid count}_{block}/\text{total node}_{block} \quad (4)$$

In the equation (4), valid count$_{block}$ represents the data volume of the valid data stored by the physical units. total node$_{block}$ represents a number of nodes included by the physical units.

It should be noted that the memory management circuit 502 provided by the invention may also select the other source units sued by utilizing other parameters and methods of the physical unit, which are not particularly limited in the invention.

Figure 9:
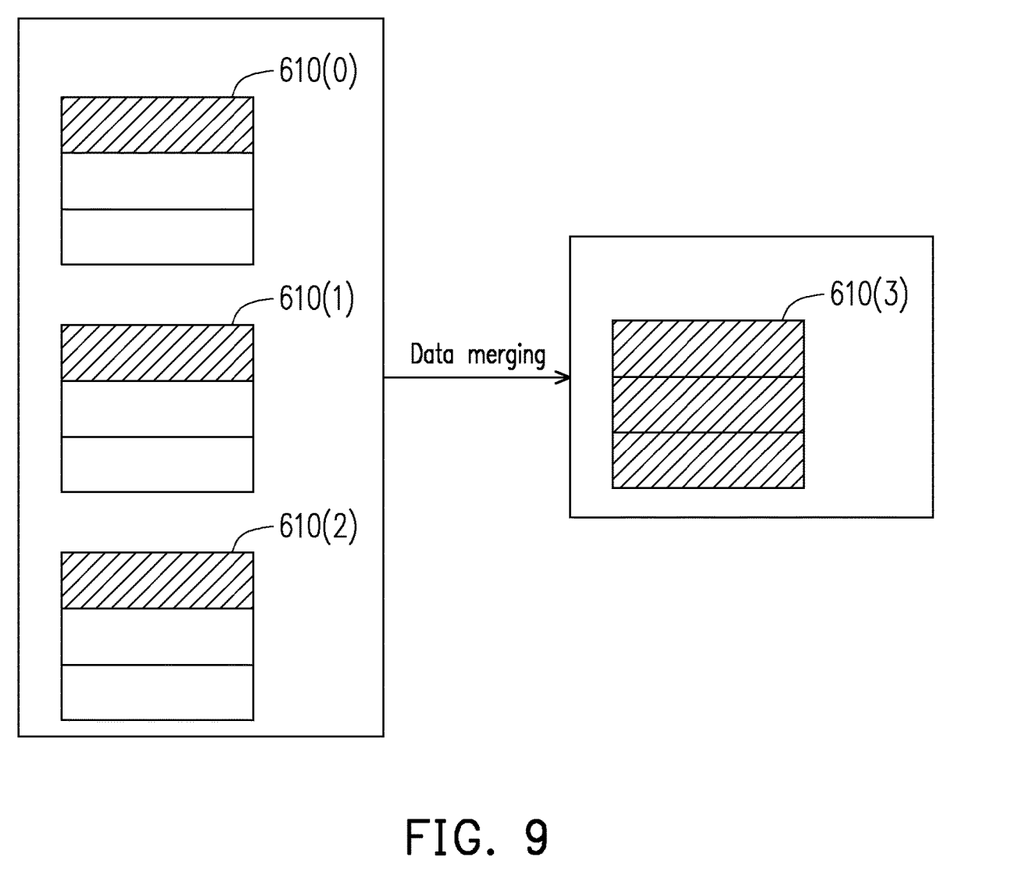
FIG. 9 is a schematic diagram illustrating management of a rewritable non-volatile memory module according to an exemplary embodiment of the invention.

FIG. 9 is a schematic diagram illustrating management of a rewritable non-volatile memory module according to an exemplary embodiment of the invention.

Referring to FIG. 9, the physical unit 610(0) is selected as the risk physical unit in which the data is to be distributed in this data merging process. The physical units 610(1) and 610(2) are selected as the source units in this data merging process, and the physical unit 610(3) is the recycling unit. In this exemplary embodiment, when performing the data merging process on the physical unit 610(0), the memory management circuit 502 determines the to-be-distributed valid data in the physical unit 610(0) according to the first management information. The memory management circuit 502 selects the physical units 610(1) and 610(2) as the source units according to the data read ratio and the valid data ratio corresponding to the physical units, and analyzes the valid data in the physical units 610(1) and 610(2). In this way, through the data merging process, the memory management circuit 502 can merge the valid data of the physical units 610(0), 610(1) and 610(2), and copy the merged valid data to the physical unit 610(3). It should be noted that the oblique shaded parts of the physical units 610(0), 610(1), 610(2) and 610(3) in FIG. 9 are the stored valid data.

According to the foregoing embodiment, this exemplary embodiment divides the valid data stored in the risk physical unit into multiple copies (e.g., 3 copies) to be distributed, and the remaining data used in this data merging process is obtained from other source units. Thus, according to the memory management method provided by the exemplary embodiment of the invention, the memory management circuit 502 can distribute the valid data stored in the risk physical unit through the data merging processes executed multiple times to achieve the effect of distributing the read count.

The memory management circuit 502 can determine the recycling unit according to different methods, and the invention does not limit the method of determining the recycling unit. In an exemplary embodiment, when the data merging process is performed, the memory management circuit 502 calculates the read count threshold associated with each physical unit. The memory management circuit 502 determines the recycling unit according to the read count threshold. For example, the read count threshold may be recalculated according to an erase count of the physical unit. In an exemplary embodiment, a corresponding relationship between the erase count and the read count threshold may be stored in a look-up table, and the memory management circuit 502 can input the erase count into the look-up table and use an output of the look-up table as the read count threshold corresponding to the erase count. The corresponding relationship between the erase count and the read count threshold is shown in Table 1 below. For different memories, the relationship between the erase count and the read count threshold may also be different. For the SLC (Single Level Cell) NAND flash memory module, the read count threshold will decrease as the erase count increases. On the other hand, for the MLC (Multi Level Cell) NAND flash memory module, the read count threshold will first increase and then decrease as the erase count increases.

TABLE 1

|  | Erase count | Read count threshold |
|---|---|---|
| FULL SLC Erase Count Group | 00-50 | 5.0M |
|  | 51-4000 | 5.0M |
|  | 4001-10000 | 3.2M |
|  | 10001-20000 | 2.5M |
|  | 20001- | 600k |
| FULL TLC Erase Count Group | 0-50 | 1.0M |
|  | 51-150 | 2.6M |
|  | 151-500 | 2.0M |
|  | 501-1000 | 1.5M |
|  | 1001- | 518k |
| Open SLC Erase Count Group | 00-50 | 3.0M |
|  | 51-4000 | 3.0M |
|  | 4001-10000 | 2.1M |
|  | 10001-20000 | 1.6M |
|  | 20001- | 400k |
| Open TLC Erase Count Group | 0-50 | 500k |
|  | 51-150 | 1.4M |
|  | 151-500 | 1.1M |
|  | 501-1000 | 800k |
|  | 1001- | 250k |

In other embodiments, the corresponding relationship between the erase count and the read count threshold may also be calculated using equations, and the invention is not limited thereto. It should be noted that the read count threshold in the equation (3) above may also be calculated using the method provided by this exemplary embodiment.

In another exemplary embodiment, the memory management circuit 502 determines the recycling unit according to the first variation. The memory management circuit 502 selects the physical unit having the first variation being the smallest as the recycling unit. Specifically, when performing the data merging process, the memory management circuit 502 calculates the first variation associated with each physical unit, and ranks the first variations of the physical units. The memory management circuit 502 selects the recycling unit according to the ranking order from high to low. Here, the smaller the value of the first variation corresponding to the physical unit, the higher the ranking order of the physical unit selected as the recovery unit.

Figure 10:
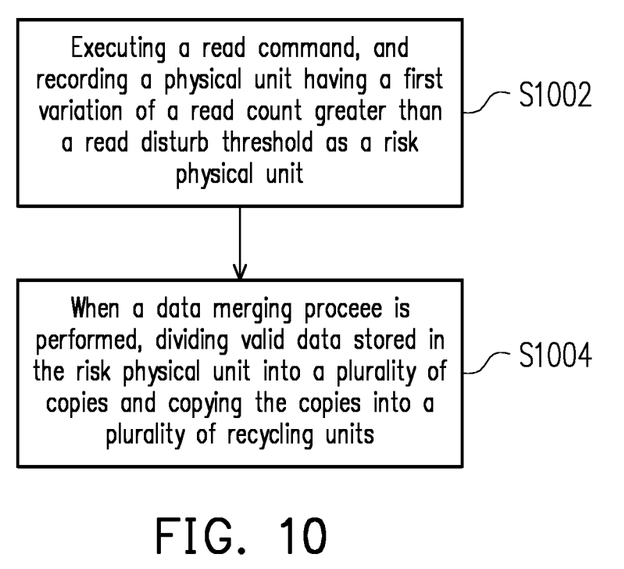
FIG. 10 is a flowchart illustrating a memory management method according to an exemplary embodiment of the invention.

FIG. 10 is a flowchart illustrating a memory management method according to an exemplary embodiment of the invention.

Referring to FIG. 10, in step S1002, a read command is executed, and a physical unit having a first variation of a read count greater than a read disturb threshold is recorded as a risk physical unit. In step S1004, when a data merging process is performed, valid data stored in the risk physical unit is divided into a plurality of copies and the copies are copied into a plurality of recycling units.

Figure 11:
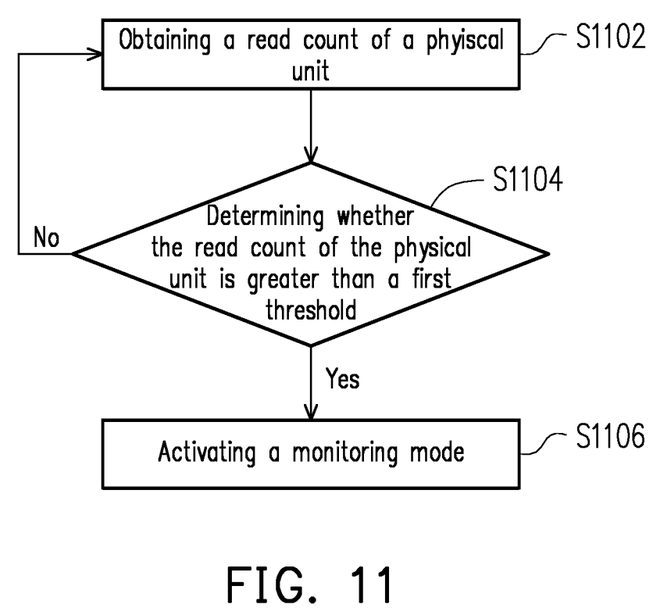
FIG. 11 is a flowchart illustrating a memory management method according to an exemplary embodiment of the invention.

FIG. 11 is a flowchart illustrating a memory management method according to an exemplary embodiment of the invention.

Referring to FIG. 11, in step S1102, a read count of a procedure is obtained. In step S1104, whether the read count of the physical unit is greater than a first threshold is determined. If yes, step S1106 will be executed to activate a monitoring mode. If not, the method returns back to step S1102.

Nevertheless, each of steps depicted in FIG. 10 and FIG. 11 have been described in detail as above, thus related description thereof is not repeated hereinafter. It should be noted that, the steps depicted in FIG. 10 and FIG. 11 may be implemented as a plurality of program codes or circuits, which are not particularly limited in the invention. Moreover, the methods disclosed in FIG. 10 and FIG. 11 may be implemented with reference to above embodiments, or may be implemented separately, which are not particularly limited in the invention.

In summary, the memory management method, the memory storage device, and the memory control circuit unit provided by the embodiments of the invention can divide the valid data stored in the physical unit having the read disturb risk into multiple copies for distribution. In this way, the number of data transfers caused by the read count of the physical unit accumulated excessively fast can be reduced, thereby improving the system performance of the memory storage device. Moreover, in the embodiments of the invention, the pre-monitoring threshold is used to start monitoring the physical units having the read disturb risk in the rewritable non-volatile memory module early. In this way, the physical units having the read disturb risk can be monitored to obtain the physical units that have been intensively read recently for data distribution, so as to achieve a better effect of distributing the read count.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, wherein the rewritable non-volatile memory module comprises a plurality of physical units, and the memory management method comprises:
    executing one or more read commands, and recording the physical unit having a first variation of read count greater than a read disturb threshold as a risk physical unit; and
    when a data merging process is performed, dividing data volume of valid data stored in the risk physical unit by a distribution count to generate a to-be-distributed data volume and respectively copying valid data corresponding to the to-be-distributed data volume in the risk physical unit into a plurality of recycling units.

2. The memory management method of claim 1, wherein the step of respectively copying valid data corresponding to the to-be-distributed data volume in the risk physical unit into the plurality of recycling units comprises:
    selecting one or more of the physical units as the one or more source units according to a data read ratio and a valid data ratio corresponding to the physical units.

3. The memory management method of claim 2, wherein the method further comprises:
    calculating the data read ratio according to the read counts and a read count threshold corresponding to the physical units; and calculating the valid data ratio according to a data volume of the valid data stored by the physical units and a number of nodes included by the physical units.

4. The memory management method of claim 1, wherein the method further comprises:
creating first management information, wherein the first management information is configured to record a risk value of a logical-to-physical mapping table corresponding to the risk physical unit; and
when the data merging process is performed, selecting to-be-distributed valid data in the risk physical unit according to the risk value in the first management information.

5. The memory management method of claim 1, wherein the method further comprises:
determining whether to start recording the risk physical unit according to a first threshold; and
determining whether to perform the data merging process according to a second threshold, wherein the first threshold is different from the second threshold.

6. The memory management method of claim 1, wherein the method further comprises:
obtaining the first variation by dividing a variation of the read count by the read count.

7. The memory management method of claim 1, wherein the method further comprises:
ranking the first variations of the physical units; and
selecting the recycling units according to a ranking order from high to low, wherein the ranking order of the physical unit is higher when a value of the first variation corresponding to the physical unit is smaller.

8. A memory storage device, comprising:
a connection interface unit, configured to couple to a host system;
a rewritable non-volatile memory module, wherein the rewritable non-volatile memory module comprises a plurality of physical units; and
a memory control circuit unit, coupled to the connection interface unit and the rewritable non-volatile memory module,
wherein the memory control circuit unit is configured to execute one or more read commands, and record the physical unit having a first variation of a read count greater than a read disturb threshold as a risk physical unit, and
when a data merging process is performed, the memory control circuit unit is further configured to divide data volume of valid data stored in the risk physical unit by a distribution count to generate a to-be-distributed data volume and respectively copying valid data corresponding to the to-be-distributed data volume in the risk physical unit into a plurality of recycling units.

9. The memory storage device of claim 8, wherein in the operation of respectively copying valid data corresponding to the to-be-distributed data volume in the risk physical unit into the plurality of recycling units, the memory control circuit unit is further configured to select one or more of the physical units as the one or more source units according to a data read ratio and a valid data ratio corresponding to the physical units.

10. The memory storage device of claim 9, wherein the memory control circuit unit is further configured to calculate the data read ratio according to the read counts and a read count threshold corresponding to the physical units, and
the memory control circuit unit is further configured to calculate the valid data ratio according to a data volume of the valid data stored by the physical units and a number of nodes included by the physical units.

11. The memory storage device of claim 8, wherein the memory control circuit unit is further configured to create first management information, wherein the first management information is configured to record a risk value of a logical-to-physical mapping table corresponding to the risk physical unit, and
when the data merging process is performed, the memory control circuit unit is further configured to select to-be-distributed valid data in the risk physical unit according to the risk value in the first management information.

12. The memory storage device of claim 8, wherein the memory control circuit unit is further configured to determine whether to start recording the risk physical unit according to a first threshold, and
the memory control circuit unit is further configured to determine whether to perform the data merging process according to a second threshold, wherein the first threshold is different from the second threshold.

13. The memory storage device of claim 8, wherein the memory control circuit unit is further configured to obtain the first variation by dividing a variation of the read count by the read count.

14. The memory storage device of claim 8, wherein the memory control circuit unit is further configured to rank the first variations of the physical units, and
the memory control circuit unit is further configured to select the recycling units according to a ranking order from high to low, wherein the ranking order of the physical unit is higher when a value of the first variation corresponding to the physical unit is smaller.

15. A memory control circuit unit for controlling a rewritable non-volatile memory module, wherein the rewritable non-volatile memory module comprises a plurality of physical units, wherein the memory control circuit unit comprises:
a host interface, configured to couple to a host system,
a memory interface, configured to couple to the rewritable non-volatile memory module; and
a memory management circuit, coupled to the host interface and the memory interface;
wherein the memory management circuit is configured to execute one or more read commands, and record the physical unit having a first variation of a read count greater than a read disturb threshold as a risk physical unit, and
when a data merging process is performed, the memory management circuit is further configured to divide data volume of valid data stored in the risk physical unit by a distribution count to generate a to-be-distributed data volume and respectively copying valid data corresponding to the to-be-distributed data volume in the risk physical unit into a plurality of recycling units.

16. The memory control circuit unit of claim 15, wherein in the operation of respectively copying valid data corresponding to the to-be-distributed data volume in the risk physical unit into the plurality of recycling units, the memory management circuit is further configured to select one or more of the physical units as the one or more source units according to a data read ratio and a valid data ratio corresponding to the physical units.

17. The memory control circuit unit of claim 16, wherein the memory management circuit is further configured to calculate the data read ratio according to the read counts and a read count threshold corresponding to the physical units, and the memory management circuit is further configured to calculate the valid data ratio according to a data volume of the valid data stored by the physical units and a number of nodes included by the physical units.

18. The memory control circuit unit of claim 15, wherein the memory management circuit is further configured to create first management information, wherein the first management information is configured to record a risk value of a logical-to-physical mapping table corresponding to the risk physical unit, and when the data merging process is performed, the memory management circuit is further configured to select to-be-distributed valid data in the risk physical unit according to the risk value in the first management information.

19. The memory control circuit unit of claim 15, wherein the memory management circuit is further configured to determine whether to start recording the risk physical unit according to a first threshold, and the memory management circuit is further configured to determine whether to perform the data merging process according to a second threshold, wherein the first threshold is different from the second threshold.

20. The memory control circuit unit of claim 15, wherein the memory management circuit is further configured to obtain the first variation by dividing a variation of the read count by the read count.

21. The memory control circuit unit of claim 15, wherein the memory management circuit is further configured to rank the first variations of the physical units, and the memory management circuit is further configured to select the recycling units according to a ranking order from high to low, wherein the ranking order of the physical unit is higher when a value of the first variation corresponding to the physical unit is smaller.

* * * * *